(12) United States Patent
Luce

(10) Patent No.: US 9,834,044 B2
(45) Date of Patent: Dec. 5, 2017

(54) DEVICE FOR FIXING AN ELECTRONIC BOX IN THE WHEEL OF A VEHICLE

(71) Applicant: LDL Technology, Ramonville Saint Agne (FR)

(72) Inventor: Dominique Luce, Bordes de Rivière (FR)

(73) Assignee: LDL Technology SAS, Ramonville Saint Agne (FR)

( * ) Notice: Subject to any disclaimer, the term of this patent is extended or adjusted under 35 U.S.C. 154(b) by 139 days.

(21) Appl. No.: 14/941,356

(22) Filed: Nov. 13, 2015

(65) Prior Publication Data

US 2016/0229237 A1    Aug. 11, 2016

(30) Foreign Application Priority Data

Nov. 17, 2014   (FR) ...................................... 14 61047

(51) Int. Cl.
*B60C 23/02*     (2006.01)
*B60C 23/04*     (2006.01)
*B29D 30/00*     (2006.01)

(52) U.S. Cl.
CPC ...... *B60C 23/0493* (2013.01); *B29D 30/0061* (2013.01); *B60C 23/0486* (2013.01); *B29D 2030/0072* (2013.01)

(58) Field of Classification Search
CPC . B60C 23/04; B60C 23/0486; B60C 23/0491; B60C 23/0493; B29D 30/0061; B29D 2030/0072
USPC ........................................ 73/146, 146.2, 431
See application file for complete search history.

(56) References Cited

U.S. PATENT DOCUMENTS

| 2012/0085160 A1* | 4/2012 | Dussinger ........... B60C 23/0411 73/146.5 |
| 2012/0160409 A1* | 6/2012 | Townsend ........... B60C 23/0493 156/281 |

* cited by examiner

*Primary Examiner* — Benjamin Schmitt
(74) *Attorney, Agent, or Firm* — Paul & Paul

(57) ABSTRACT

A device (D) fixes, to the internal wall of a tire (P), an electronic box (100) for measuring parameters inside the tire, the device (D) associating the box (100) with a flexible receptacle (200) which, being fixed to the internal wall by an adhesion means (300), is preformed so as to accept and hold said box (100), remarkable in that said flexible receptacle (200) forms a compartment (210) equipped with an opening (220), by means of which said box (100) is introduced and which is bordered by an edge (221) extending externally and offering a contact surface (222) for the adhesion means (300) so that, once the receptacle (200) is fixed, said opening (220) is closed by the internal wall on which the receptacle (200) is fixed.

8 Claims, 4 Drawing Sheets

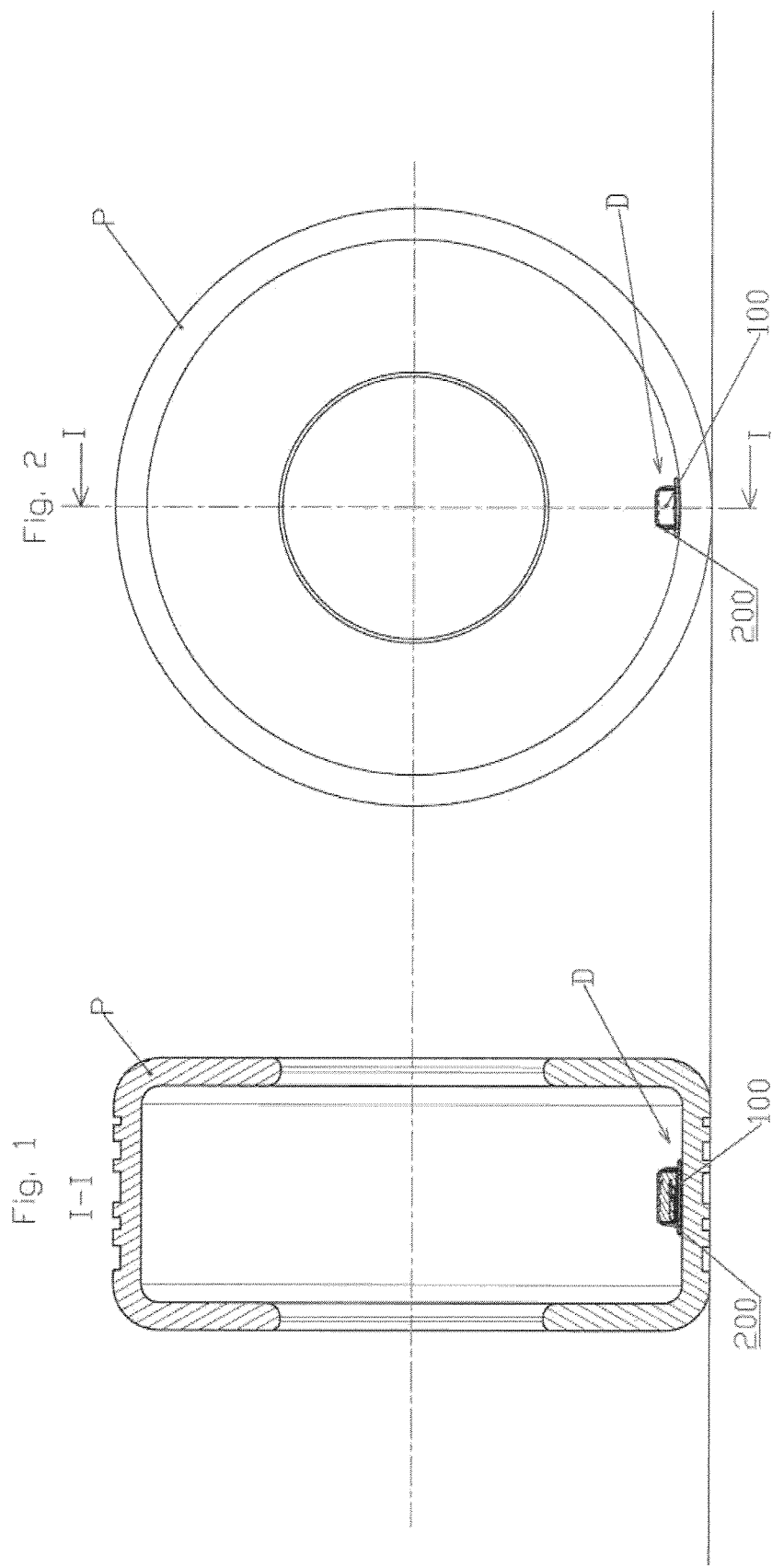

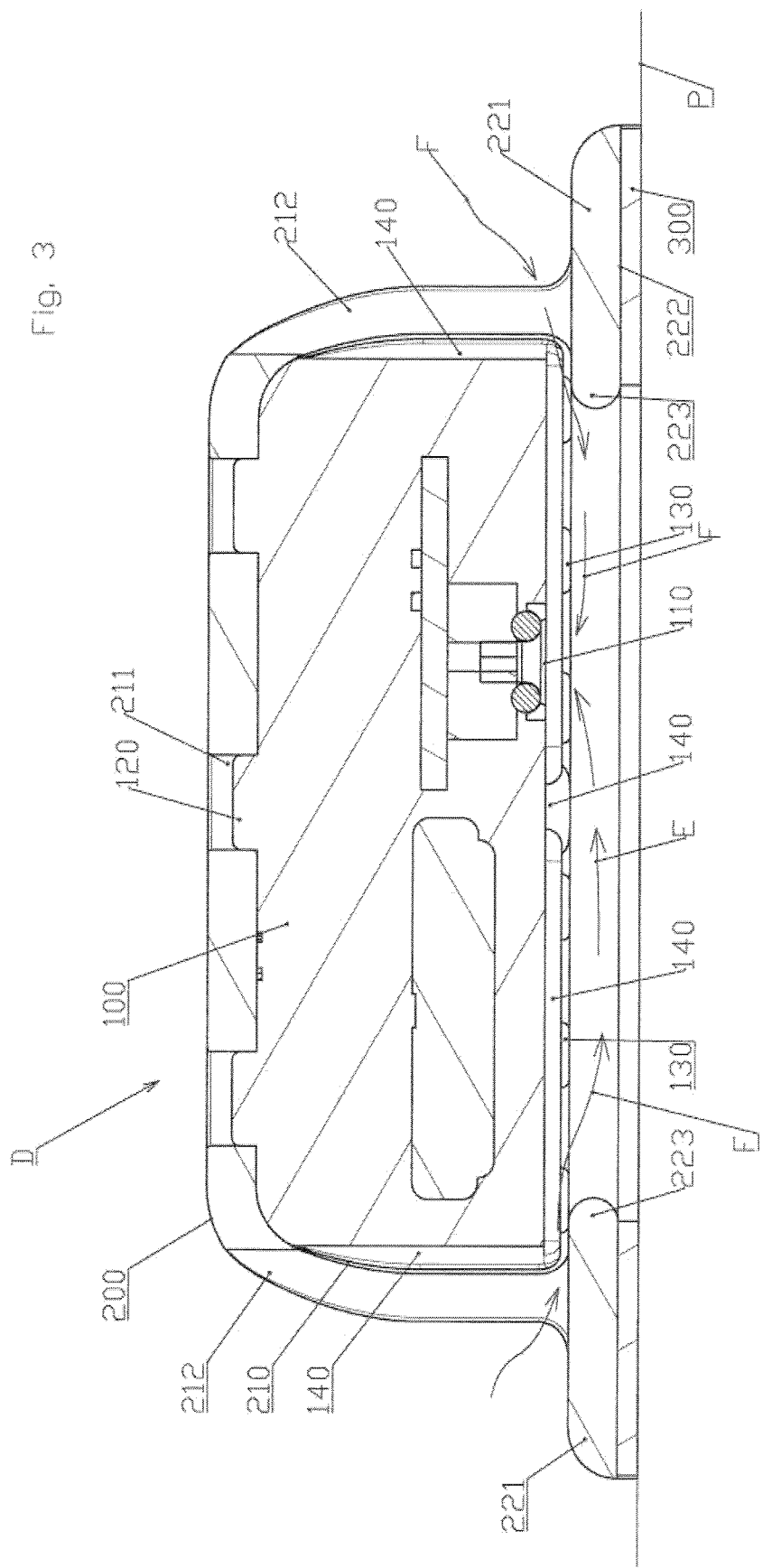

DEVICE FOR FIXING AN ELECTRONIC BOX IN THE WHEEL OF A VEHICLE

FIELD OF APPLICATION OF THE INVENTION

The present invention relates to the field of the detection of parameters inside wheels of a vehicle and in particular to the adaptations enabling a detection box to be fixed inside a wheel and more particularly to the internal wall of the tyre on the wheel.

DESCRIPTION OF THE PRIOR ART

There exist a plurality of solutions for fixing electronic boxes containing the sensors for measuring parameters such as the temperature and pressure inside a tyre on a wheel.

The existing fixing solutions consist of fixing the box to the internal walls of the tyre and/or orienting the measurement-taking orifices as described in the documents FR 2899150, DE 102007010782, WO 2004/002758, WO 2013/153088, US 2013/0125640 and WO 2014/027067.

Such a solution nevertheless has several drawbacks, including the following:
- the proximity of the box to the tread of the tyre subjects it to the same shocks, changes in temperature and deformations (such as folding) as those suffered by the tyre in a wide spectrum of frequencies,
- the heat exchange due to this proximity is detrimental to the service life of the electronic box and its components,
- centrifugal force tends to keep the sensor in position but also to orient outwards any material contained in the tyre then tending to obstruct the orifices of the sensor or sensors,
- when centrifugal force does not sufficiently hold the box, the latter may be ejected from the housing in which it has been placed, for example when the tyre passes over a pavement corner at low speed.

More recently, the applicant described, in the document EP 2641756, a device for fixing a measurement-taking box on the internal wall of a tyre, remarkable in that it comprised at least one bracing element interposed between the box and said internal wall so as to create a space between the box and said internal wall. This space made it possible to create an intermediate zone for preventing or attenuating the transmission of shocks and heat. In addition, it gave the possibility of orienting the box so that the measurement-taking orifice giving access to the sensor is open between said box and the internal face of the tread of the tyre so that any material contained in the tyre projected by centrifugal force does not obstruct the orifices of the sensor or sensors.

The applicant nevertheless found that the original fixing of the brace could be improved.

DESCRIPTION OF THE INVENTION

The applicant therefore carried out research aimed at improving the fixing of an electronic measurement-taking box while keeping the advantages of good orientation of the box.

This research resulted in the design and production of a device for fixing to the internal wall of a tyre an electronic box for measuring parameters inside the tyre, said box being preformed with an orifice making its internal space communicate with the internal space of the tyre, the device comprising said box and a flexible receptacle that is fixed to said internal wall by adhesion means is preformed to accept and retain said box, said flexible receptacle forming a compartment equipped with an opening, through which said box is introduced and which is bordered by an edge extending externally and offering a contact surface for the adhesion means, so that, once the receptacle is fixed, said opening is closed by the internal wall to which the receptacle is fixed, said opening being equipped with another edge referred to as the internal edge which, extending internally, creates a narrowing for the purpose of retaining the box in said compartment and a brace defining a space between the box and the internal wall of the tyre.

According to the invention, the device is remarkable in that said box is oriented in said compartment so that its orifice opens onto said space and said box and/or said receptacle are preformed with passages making the space created inside the compartment communicate with the inside of the tyre.

This feature is particularly advantageous in that it provides a receptacle that must accept the box before fixing and the opening of which is closed by the wall on which the receptacle is bonded. There is then no longer any risk of rejection of the box in accordance with the objectives of the invention.

The space defined prevents direct contact of the box against the internal wall, which firstly isolates said box and secondly preserves the internal impervious layer of the tyre.

Furthermore, as said box is oriented in said compartment so that its orifice opens onto said space, the orifice provided in the box is not subjected to projections that centrifugal force is liable to create and is itself protected by the walls of the compartment. According to a preferred but non-limitative embodiment, the device is fixed to the internal face of the tread of the tyre.

This orientation of the box nevertheless requires features to enable the taking of measurements properly. Thus, to do this, said box and/or said receptacle are preformed with passages.

According to another feature, the walls of the compartment are pierced by at least one hole. According to a preferred embodiment, said walls are pierced by a plurality of holes.

Said box is itself preformed with at least one projection cooperating with said hole while being housed therein in order to reduce the surface area of the contact points between the box and the compartment and to prevent thermal or physical stresses transmitted by the tyre to the compartment being transferred to the box. Thus, although the receptacle is deformable, its internal walls are adjusted to the body of the box and cooperate by means of this projection/hole connection.

According to a preferred embodiment, said box is preformed with a plurality of projections cooperating with a plurality of holes pierced in said walls of the compartment.

Subjected indirectly to stresses and shocks, the box will move and discharge the energy of the shock kinetically and then transfer this energy to the receptacle, the elastic flexible nature of which provides dispersion of the initial energy of the shock. This connection reduces the movements of the box while allowing passage of air for measuring the pressure and temperature of the tyre. These holes have other functions of enabling water or other liquid soaps to escape from the receptacle and not to remain accumulated by capillarity on the orifice with which the box is provided for the purpose of taking the pressure.

According to another particularly advantageous feature, said box is preformed with projections coming into abutment on the internal edge of the opening of the compartment. These projections reduce the surface area of the contact points and create a space between the surface of the internal edge and the surface of the box, a space where air can circulate.

To facilitate this circulation, said box and/or said receptacle are preformed with passages making the space created inside the compartment communicate with the inside of the tyre both to allow good taking of measurements and also to facilitate discharge. According to a particularly advantage feature, said box is preformed externally with grooves in which said orifice preformed in the box communicates. The walls of the compartment are preformed with orifices communicating with said grooves, guaranteeing that the orifice of the box communicates with the internal space of the tyre. In addition, these grooves and orifices matching each other will facilitate discharge of any material liable to be introduced between the box and said internal wall.

The function of circulation of air is thus associated with the function of discharge out of the compartment of fluids trapped in the tyre, such as water, mounting soap, anti-puncture liquid, etc.

Said box and said receptacle adopt an oblong shape and are disposed on the internal wall of the tread of the tyre so that the greatest length is positioned on the width of the tyre. Such an arrangement also helps to protect the box and receptacle against the deformations suffered by the tyre. In addition, such a shape prevents any attack on the internal walls of the receptacle by offering a space without projecting edges.

According to a preferred embodiment, the receptacle is produced from an elastic flexible material such as rubber. The box is fitted in place by stretching the periphery of the opening. The box is then held, is under slight compression and is not in direct contact with the tyre.

This receptacle is sufficiently deformable to prevent shocks and stresses to which the tyre is subjected being transmitted to the box and to the sensor that it contains.

The adhesion means may be mechanical, chemical or molecular.

According to another particularly advantageous feature, the box is produced by overmoulding of its components in a resin, thus making it possible to produce the same shape while allowing overmoulding of various types of components such as batteries, which may differ according to the requirement of the customer.

The fundamental concepts of the invention having been disclosed above in their most elementary form, other details and features will emerge more clearly from a reading of the following description with regard to the accompanying drawings, giving by way of non-limitative example an embodiment of a device according to the invention.

BRIEF DESCRIPTION OF THE DRAWINGS

FIG. 1 is a schematic drawing of a front view in cross-section of a tyre equipped with an embodiment of the device of the invention;

FIG. 2 is a schematic drawing of a side view in partial cross-section of the tyre of FIG. 1;

FIG. 3 is a schematic drawing of a front view in cross-section of an embodiment of the device according to the invention;

DESCRIPTION OF A PREFERRED EMBODIMENT

As illustrated on the drawings in FIGS. 1 and 2, the tyre P is equipped on the internal face of its tread with a fixing device referenced D overall.

This device D associates a box 100 with a flexible receptacle having the following features:
the box 100 contains the various electronic components necessary for taking measurements of temperature and/or pressure inside the tyre and communication of said measurements;
the flexible receptacle 200 is bonded to said internal face by a bonding means 300 and is preformed to accept and hold said box 100.

According to a non-limitative embodiment, the receptacle 200 is produced from the same rubbery material as that of the tyre P. Thus, according to an embodiment envisaged, this receptacle 200 is vulcanised by the manufacturer of the tyre P.

According to a preferred but non-limitative embodiment illustrated, the bonding means 300 is here formed by a dual-face acrylic module prefixed on the receptacle 200 before the box is introduced into the compartment 210.

According to another non-limitative embodiment, the receptacle is stuck (as with cold vulcanisation).

According to another non-limitative embodiment, the adhesion means consists of a module for fixing by micro-suckers preformed in the receptacle or disposed between the receptacle and the tyre wall.

Said box 100 and said receptacle 200 adopt an oblong form and are disposed on the internal wall of the tread of the tyre so that the greatest length is disposed in the width of the tyre P so that, when a fold is formed on the tyre, the box is only very slightly subjected to a bending force.

Figure 4:
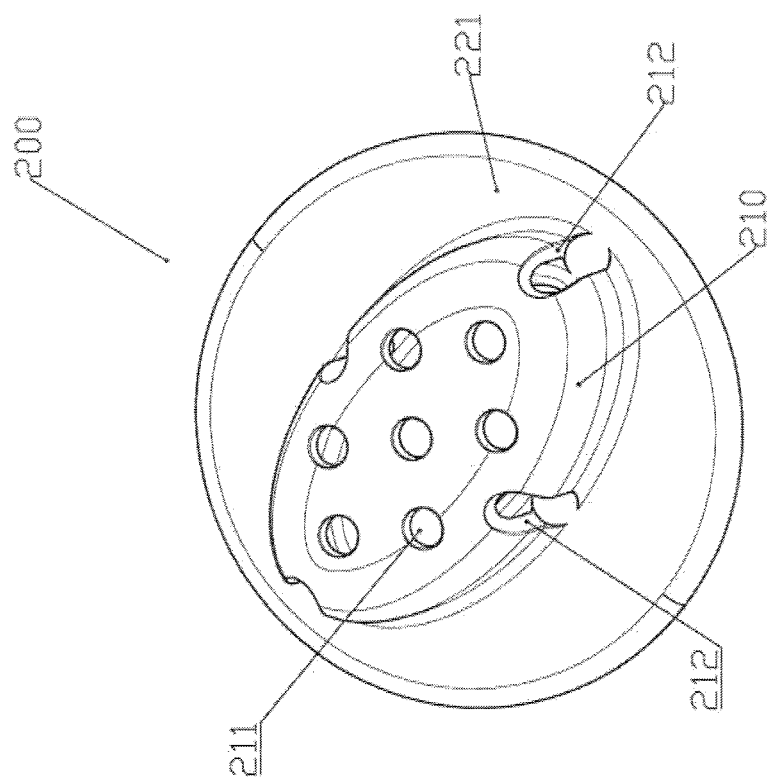
FIGS. 4 and 5 are schematic drawings of views in perspective from above and below of the receptacle alone.
Figure 5:
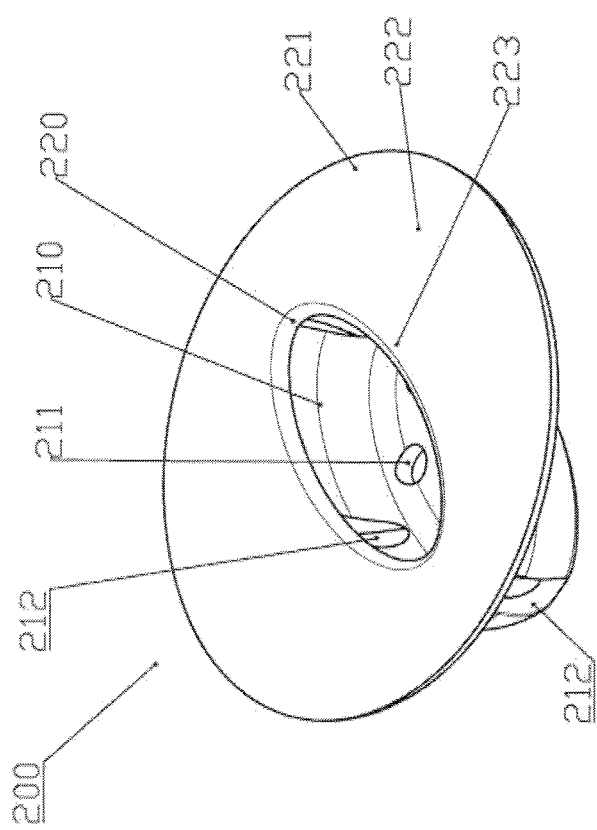
Figure 7:
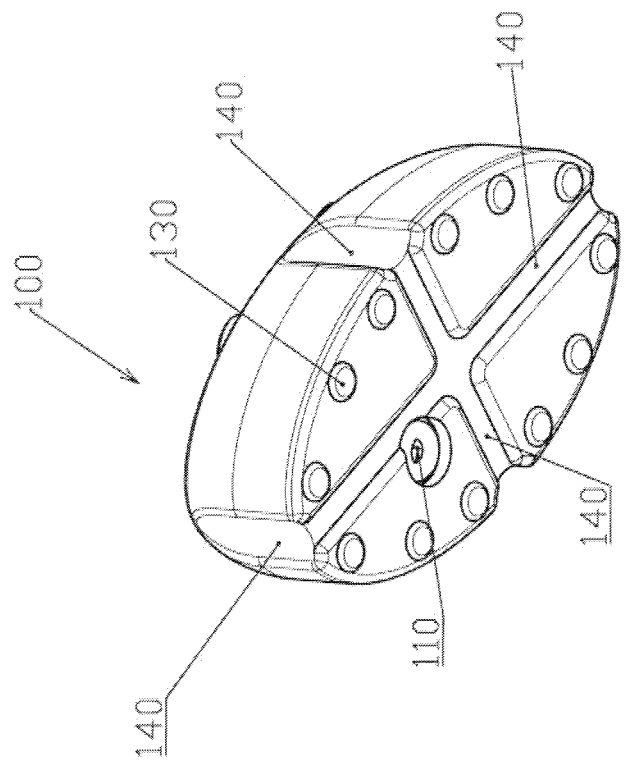
FIGS. 6 and 7 are schematic drawings of perspective views from above and below of the box alone.
Figure 6:
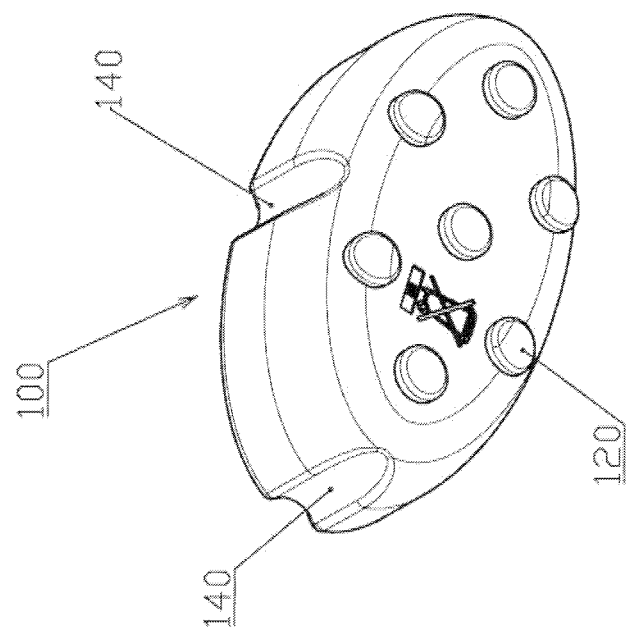

As illustrated by the drawings in FIGS. 3, 4 and 5, said flexible receptacle 200 forms an accepting compartment 210 equipped with an opening 220, through which said box 100 is introduced and which is bordered by a peripheral edge 221 extending externally and offering a surface 222 for contact with the bonding means 300 so that, once the receptacle is bonded, said opening 220 is closed by the internal wall of the tyre P to which the receptacle 200 is bonded.

Said opening 220 is equipped with a supplementary edge 223 extending internally and peripherally while creating a narrowing by reduction of the opening, for the purpose not only of holding the box in said compartment but also a bracing creating a space E between the box 100 and the internal wall of the tyre P. According to the preferred embodiment illustrated, the external 221 and internal 223 edges are preformed with the receptacle 200 while extending each other.

This is because said box 100 is preformed with an orifice 110 making its internal space communicate with the internal space of the tyre P. In accordance with the invention, said box 100 is oriented in said accepting compartment 210 of the receptacle 100 so that its orifice 110 opens onto said space E.

The top wall of the compartment 210 is pierced with a plurality of circular holes 211 in which cylindrical vertical projections 120 are introduced, preformed on the top face of the box 100 for holding purposes as illustrated in the drawings 3, 6 and 7.

Said box is also preformed on the periphery of its internal face with other cylindrical vertical projections 130 coming into abutment on the internal edge 223 of the opening 220 of the accepting compartment 210. Thus the box 100 is in contact with the surface of the receptacle 200 bonded to the tyre only by means of the ends of these projections 130. They also enable air to circulate in the space E, a circulation illustrated by the arrows F.

As illustrated, in order to facilitate this circulation (arrow F), the bottom face of said box 100 is preformed with grooves 140 disposed at right angles and communicating with the orifice 110 (the cutting planes being modified in order to make the orifice enter). These grooves 140 are extended on the sides of said box 100 and come to communicate with orifices 212 formed for this purpose in the walls of the compartment 210. According to an embodiment that is not illustrated, the box 100 is preformed so that the grooves 140 intersect at the orifice 110.

According to a preferred but non-limitative embodiment, the box 100 is entirely overmoulded in a resin of the hot melt type. According to a preferred but non-limitative embodiment, this box has a Shore A hardness ranging from 60 to 80 and the receptacle has a Shore A hardness ranging from 45 to 60.

Maintenance of the box can be achieved by tearing the wall of the compartment. According to another embodiment that is not illustrated, said receptacle 200 is equipped with a top opening controlled by Velcro that it suffices to control in order to release the box 100.

It will be understood that the device that has just been described and depicted above was described and depicted with a view to disclosure rather than limitation. Naturally various arrangements, modifications and improvements can be made to the above example without departing from the scope of the invention.

The invention claimed is:

1. A device for fixing to the internal wall of a tire, an electronic box for measuring parameters inside the tire,
   the box being preformed with an orifice making its internal space communicate with the internal space of the tire,
   the device comprising the box and a flexible receptacle that is fixed to the internal wall by adhesion means is preformed to accept and retain the box, the flexible receptacle forming a compartment equipped with an opening, through which the box is introduced and which is bordered by an edge extending externally and offering a contact surface for the adhesion means, so that, once the receptacle is fixed, the opening is closed by the internal wall to which the receptacle is fixed,
   the opening being equipped with another edge referred to as the internal edge which, extending internally, creates a narrowing for the purpose of retaining the box in the compartment and a brace defining a space between the box and the internal wall of the tire,
   characterised by the fact that the box is oriented in the compartment so that its orifice opens onto the space, and the box or the receptacle are preformed with passages making the space created inside the compartment communicate with the inside of the tire.

2. The device according to claim 1, characterised by the fact that the walls of the compartment are pierced by a hole.

3. The device according to claim 2, characterised by the fact that the box is preformed with a projection at least one projection cooperating with the hole.

4. The device according to claim 1, characterised by the fact that the box is preformed with projections coming into abutment on the internal edge of the opening in the compartment.

5. The device according to claim 1, characterised by the fact that the box is preformed externally with grooves with which the orifice communicates.

6. The device according to claim 5, characterised by the fact that the walls of the compartment are preformed with orifices communicating with the grooves.

7. The device according to claim 1, characterised by the fact that the box and the receptacle adopt an oblong form and are disposed on the internal wall of the tread of the tyre so that the greatest length is positioned on the width of the tire.

8. The device according to claim 1, characterised by the fact that the box is produced by overmoulding of its components in a resin.

* * * * *